United States Patent
Kawakami et al.

(10) Patent No.: US 8,127,622 B2
(45) Date of Patent: Mar. 6, 2012

(54) ELECTROMAGNETIC FLOWMETER HAVING A DETACHABLE MEASURING TUNE FROM THE BODY

(75) Inventors: Hiroshi Kawakami, Chigasaki (JP); Tsukasa Yamamoto, Ebina (JP); Junya Abe, Kasukabe (JP)

(73) Assignee: SMC Kabushiki Kaisha, Tokyo (JP)

( * ) Notice: Subject to any disclaimer, the term of this patent is extended or adjusted under 35 U.S.C. 154(b) by 88 days.

(21) Appl. No.: 12/409,145

(22) Filed: Mar. 23, 2009

(65) Prior Publication Data

US 2009/0260453 A1 Oct. 22, 2009

(30) Foreign Application Priority Data

Apr. 18, 2008 (JP) ................. 2008-109093

(51) Int. Cl.
  *G01F 1/58* (2006.01)
(52) U.S. Cl. .................. 73/861.12
(58) Field of Classification Search .............. None
  See application file for complete search history.

(56) References Cited

U.S. PATENT DOCUMENTS

| | | | | |
|---|---|---|---|---|
| 4,358,964 A | * | 11/1982 | Otsuka | 73/861.13 |
| 4,722,231 A | * | 2/1988 | Tanaka et al. | 73/861.12 |
| 5,280,727 A | * | 1/1994 | Hafner et al. | 73/861.12 |
| 5,385,055 A | * | 1/1995 | Kubota et al. | 73/861.12 |
| 6,237,424 B1 | | 5/2001 | Salmasi et al. | |

FOREIGN PATENT DOCUMENTS

| | | |
|---|---|---|
| CN | 1076778 A | 9/1993 |
| JP | 63-150326 | 10/1988 |
| JP | 5-72008 | 3/1993 |
| JP | 5-149766 | 6/1993 |
| JP | 7-120282 | 5/1995 |
| JP | 2001-522457 | 11/2001 |
| JP | 2007-267479 | 10/2007 |
| JP | 2007-298401 | 11/2007 |
| JP | 2007-298402 | 11/2007 |

OTHER PUBLICATIONS

Office Action issued Oct. 27, 2010, in Chinese Patent Application No. 200910132834.7 with English translation.
Korean Office Action mail date of Apr. 7, 2011, in corresponding Korean Patent Application No. 10-2009-003373, with English translation of pertinent portion.

* cited by examiner

*Primary Examiner* — Harshad Patel
(74) *Attorney, Agent, or Firm* — Oblon, Spivak, McClelland, Maier & Neustadt, L.L.P.

(57) ABSTRACT

An electromagnetic flowmeter is equipped with a pipe unit including a pipe through which a fluid to be measured flows, a pair of electrodes adhered to the pipe, and substrate holders that retain substrates therein and which are disposed so as to cover the electrodes. In addition, the pipe unit is accommodated inside a body through a first opening, which opens on one side of the body. A solenoid unit including coils is installed on the pipe unit after being inserted into the interior of the body through first and second openings.

9 Claims, 8 Drawing Sheets

ELECTROMAGNETIC FLOWMETER HAVING A DETACHABLE MEASURING TUNE FROM THE BODY

BACKGROUND OF THE INVENTION

1. Field of the Invention

The present invention relates to an electromagnetic flowmeter, which is capable of measuring a flow rate of a fluid that flows through a flow passage.

2. Description of the Related Art

Heretofore, an electromagnetic flowmeter has been known, in which a current is made to flow through a coil for forming a magnetic field within a flow passage through which a fluid flows, and wherein a flow rate of the fluid is calculated based on an electromotive force generated in accordance with the conductivity of the fluid that flows through the flow passage. Such an electromagnetic flowmeter, for example, as disclosed in Japanese Laid-Open Patent Publication No. 05-072008, is made up from a measurement tube for guiding the fluid, a flexible body equipped with a pair of electrodes therein, which are mounted onto the outside of the measurement tube, and an excitation coil separated and spaced from the measurement tube through a core. In addition, a magnetic field generated by the excitation coil is formed perpendicularly to the measurement tube, such that the electromotive force generated in the fluid is extracted by the pair of electrodes and converted into a flow rate of the fluid in a controller.

However, in the electromagnetic flowmeter according to such a conventional technique, the structure thereof is complex and ease of assembly is poor. Additionally, the apparatus itself is large in scale.

SUMMARY OF THE INVENTION

An object of the present invention is to provide an electromagnetic flowmeter at a low cost, in which ease of assembly of the flowmeter can be improved while minimizing the size and scale of the flowmeter.

An electromagnetic flowmeter according to the present invention includes a body; a measurement tube accommodated in the interior of the body and having a flow passage through which a fluid to be measured flows; a pair of electrodes disposed in confronting relation on an outer circumferential side of the measurement tube for detecting an electromotive force generated by a flow of the fluid to be measured; and a solenoid unit disposed transversely to the electrodes on the outer circumferential side of the measurement tube, and having coils, which are excited by supplying electricity thereto and which generate a magnetic field inside the measurement tube, wherein the measurement tube, or a pipe unit including the electrodes mounted on the measurement tube, is disposed detachably with respect to the body.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
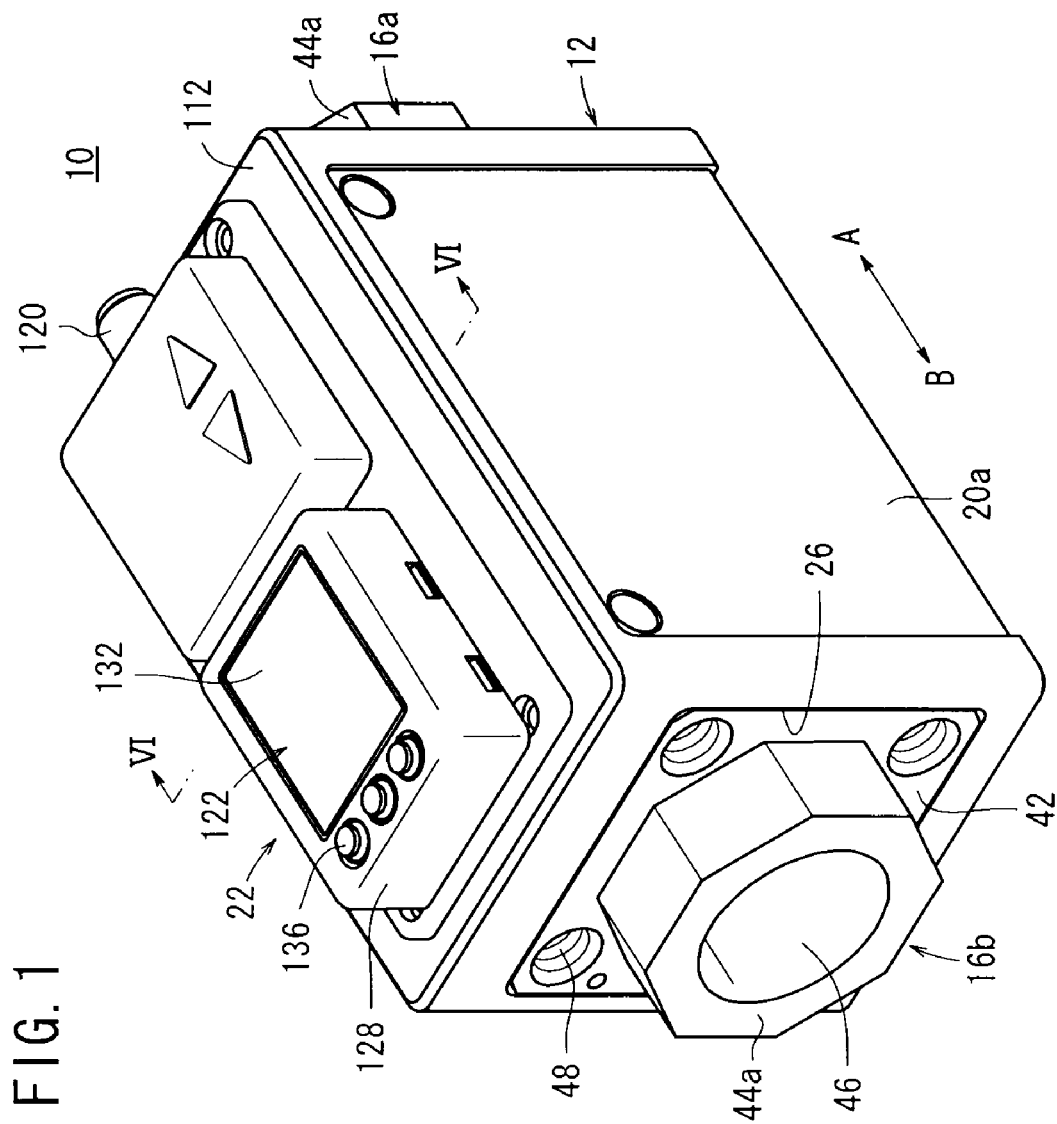
FIG. 1 is an exterior perspective view of an electromagnetic flowmeter according to an embodiment of the present invention.

In FIG. 1, reference numeral 10 indicates an electromagnetic flowmeter according to an embodiment of the present invention.

As shown in FIGS. 1 to 6, the electromagnetic flowmeter 10 includes a body 12, a pipe unit 14 accommodated inside the body 12, a pair of fittings 16a, 16b fitted to both respective ends of the body 12 and the pipe unit 14, a solenoid unit 18 disposed on both sides of the pipe unit 14 in the interior of the body 12, cover members 20a, 20b, 20c that cover side surfaces of the body 12, and a display unit 22 disposed on the upper surface of the body 12.

Figure 5:
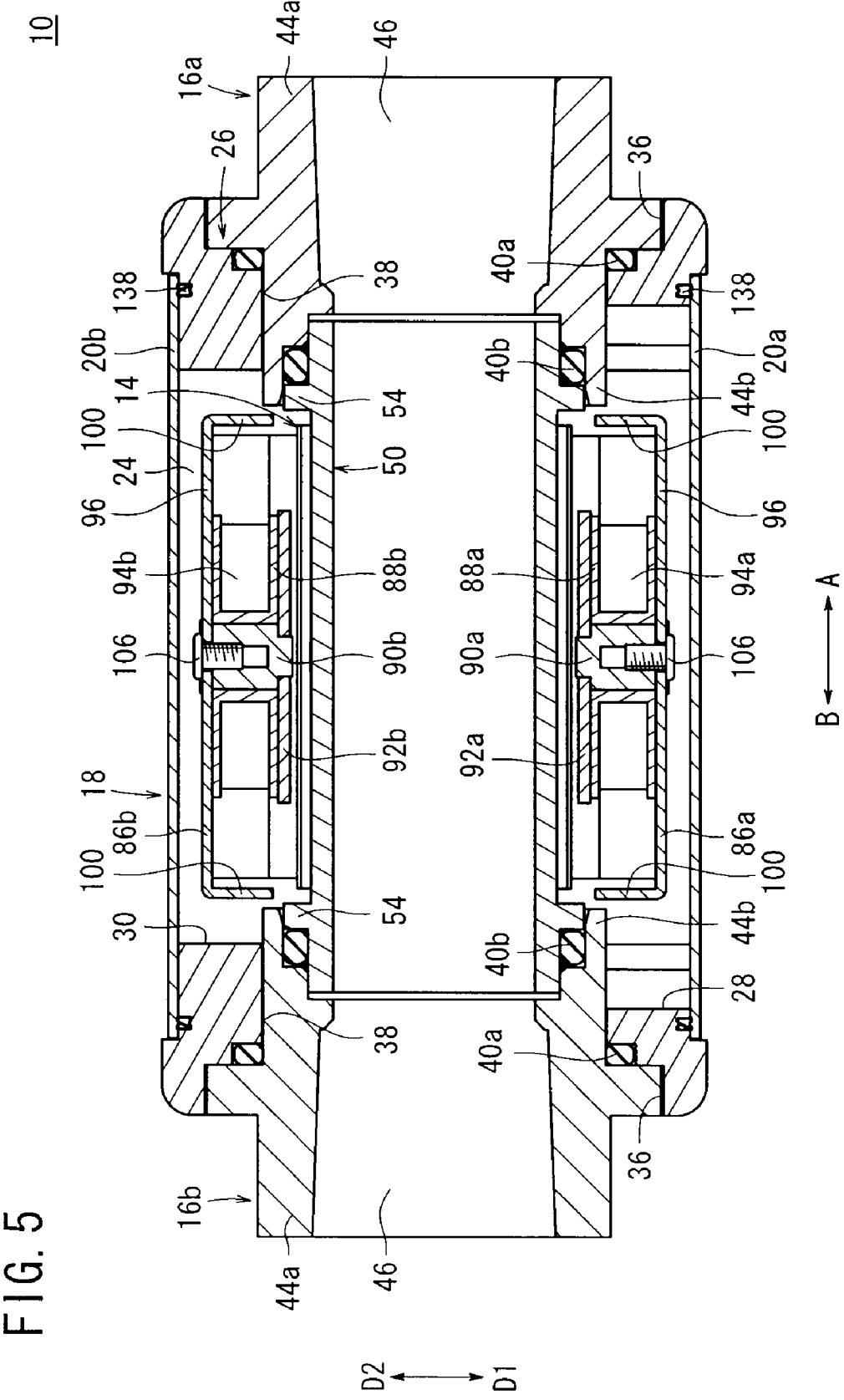
FIG. 5 is a transverse cross sectional view of the electromagnetic flowmeter of FIG. 1.
Figure 6:
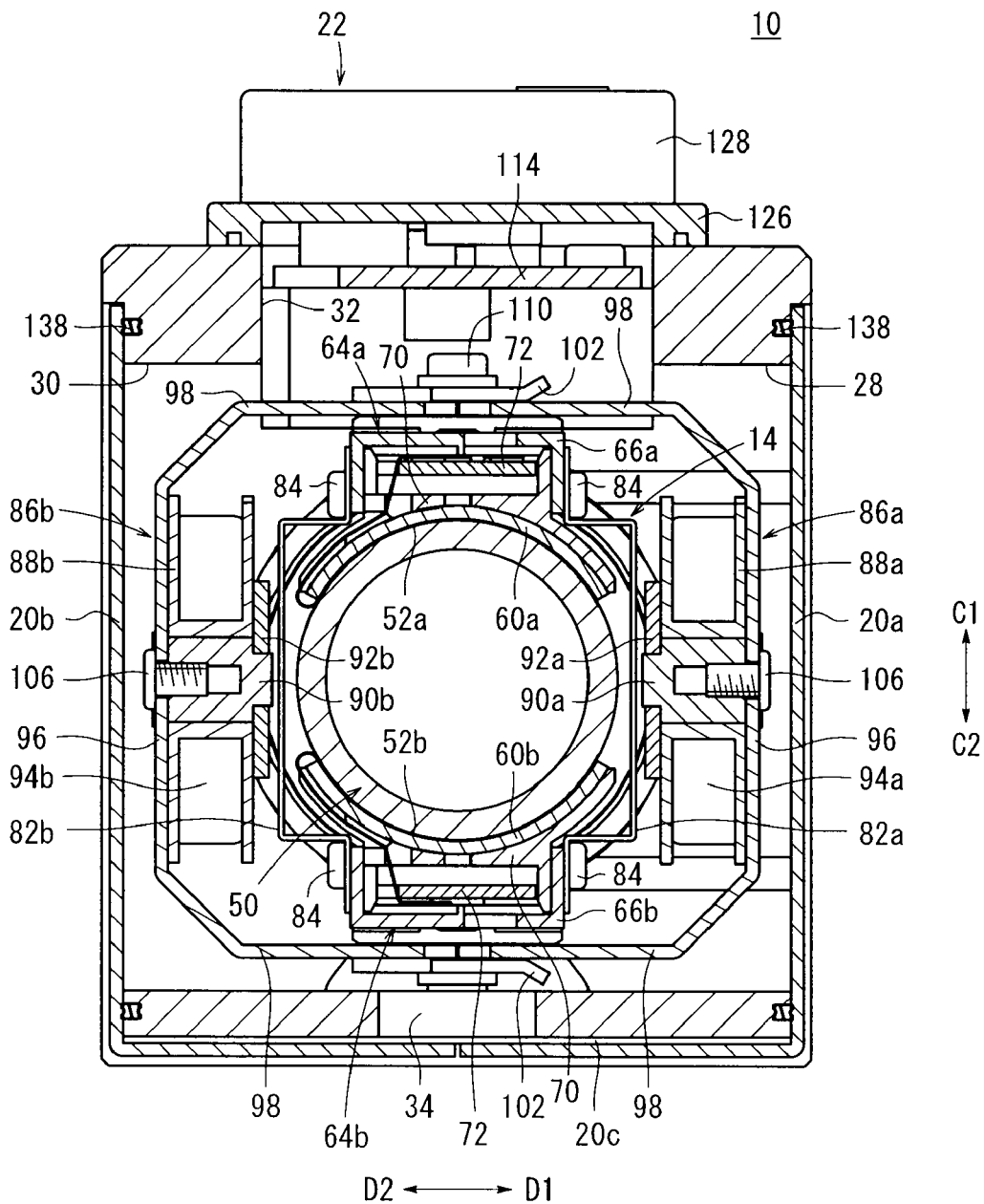
FIG. 6 is a cross sectional view taken along line VI-VI of FIG. 1.

The body 12, for example, is formed with a substantially rectangular shape in cross section from an aluminum die-cast metallic material or the like, and is formed with a hollow shape including a space 24 in the interior thereof. Installation holes 26 in which the fittings 16a, 16b are installed open at both ends thereof along the axial directions (the directions of arrows A, B) of the body 12. Further, as shown in FIGS. 5 and 6, a first opening (opening) 28 that communicates with the space 24, for insertion of the pipe unit 14 into the space 24, opens on one side surface, which is perpendicular to both end portions, of the body 12. On the other hand, in a similar manner, a second opening 30, which communicates with the space 24, opens on the other side surface of the body 12. The first and second openings 28, 30 open in a longitudinal shape along the axial directions (the directions of arrows A, B) of the body 12.

Further, as shown in FIG. 6, a third opening 32 in which the display unit 22 is installed is disposed on the upper surface of the body 12, whereas a fourth opening 34 for facilitating wiring operations and which communicates with the space 24 is formed on the bottom surface of the body 12.

Figure 4:
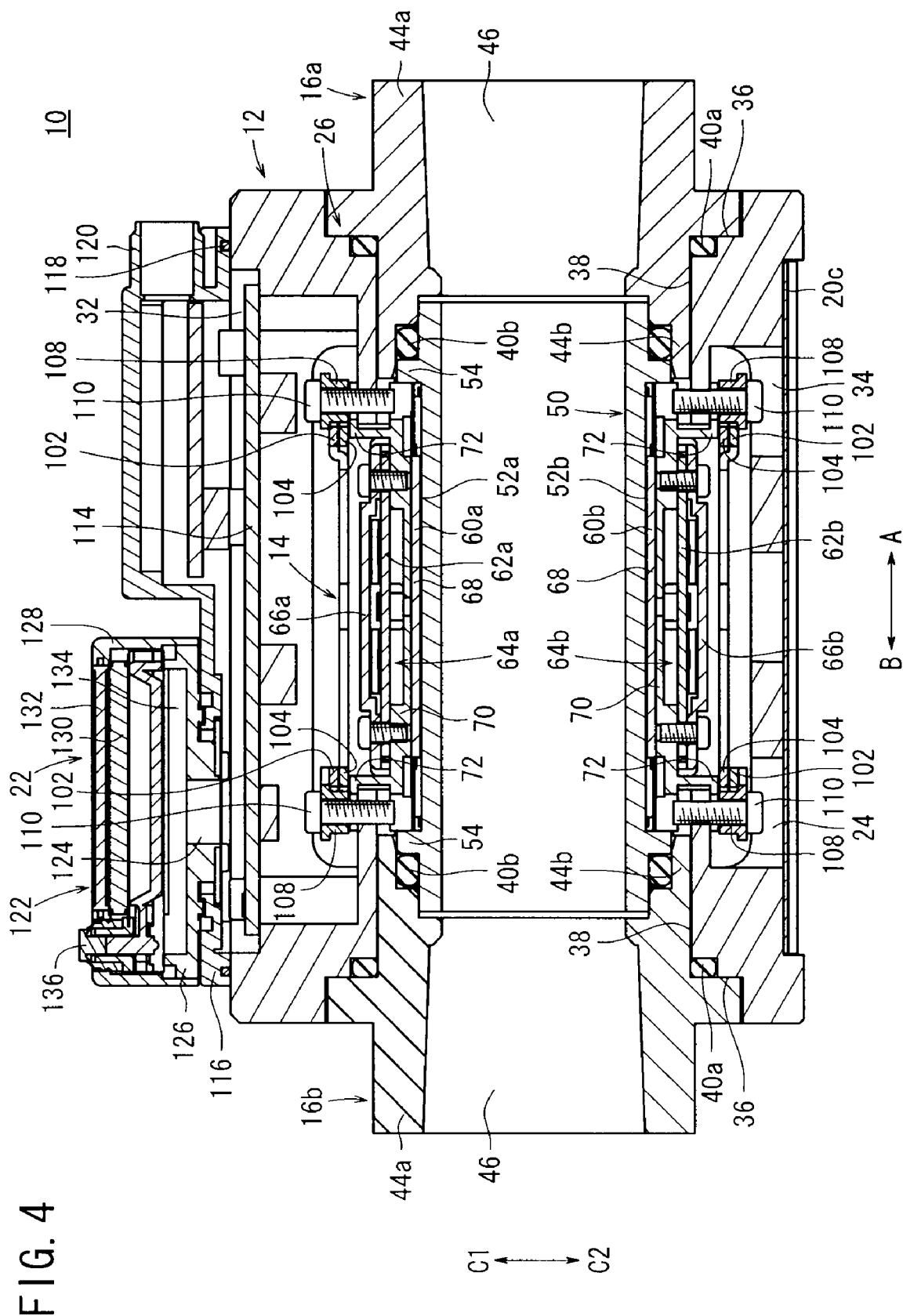
FIG. 4 is a vertical cross sectional view of the electromagnetic flowmeter of FIG. 1.

As shown in FIG. 4, the installation holes 26 are made up respectively from recesses 36, which are recessed with substantially rectangular shapes in cross section from both end surfaces of the body 12, and fitting holes 38 that open in the center of the recesses 36. O-rings (first seal members) 40a are installed respectively via annular grooves in the recesses 36 confronting the fitting holes 38.

As shown in FIGS. 3, 4, 5 and 8, the fittings 16a, 16b are each constructed from a base portion 42 formed in a rectangular shape, and a pair of tubular portions 44a, 44b, which project in respective axial directions from the centers of both side surfaces of the base portion 42, and a through hole 46 is formed therein that penetrates along a straight line through the interior of the tubular portions 44a, 44b and the base portion 42. When the fittings 16a, 16b are installed in the body 12, the base portion 42 is inserted into the recess 36 of the installation hole 26, one of the tubular portions 44b is inserted through the fitting hole 38, and the base portion 42 is fastened with respect to the body 12 by a plurality of attachment bolts 48. In this case, the other tubular portions 44a are disposed so as to project from both ends of the body 12. Moreover, screw threads may be engraved on inner circumferential surfaces of the other tubular portions 44a, so that pipes or the like (not shown) may be connected thereto.

In this manner, the paired fittings 16a, 16b are disposed mutually coaxially while sandwiching the body 12 therebetween.

Figure 7:
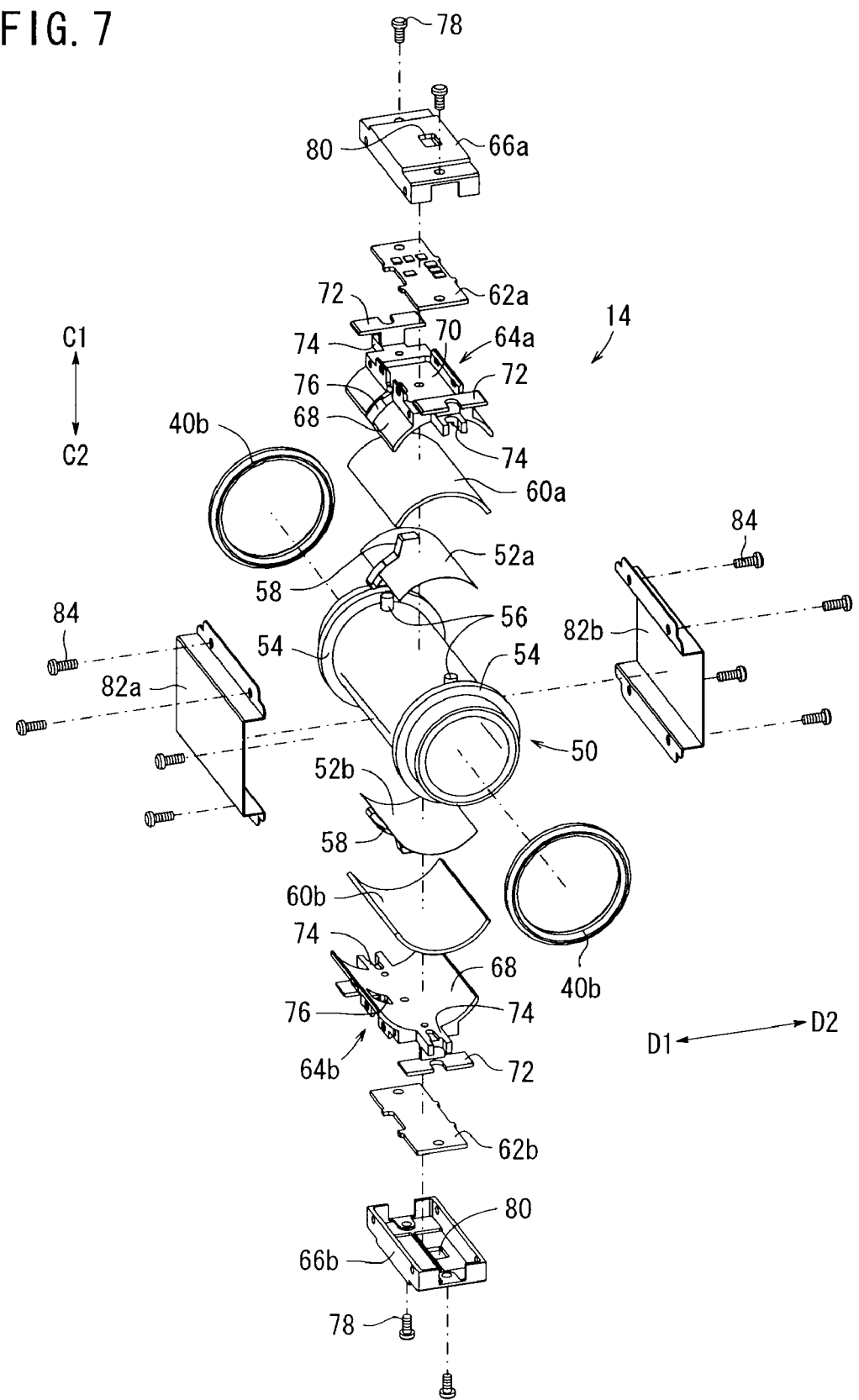
FIG. 7 is an exploded perspective view of a pipe unit that makes up the electromagnetic flowmeter of FIG. 1.

The pipe unit 14, as shown in FIGS. 4, 5, 7 includes a pipe (measurement tube) 50 having a predetermined length along the axial direction, and a pair of electrodes 52a, 52b adhered to the side surface of the pipe 50.

The pipe 50 is formed with a fixed diameter and extends along the axial directions (the directions of arrows A and B). On both ends thereof, flanges 54 are formed, which project radially outward from the outer circumferential surface of the pipe 50, for reinforcing both end portions where the pressure resistance thereof is easily deteriorated. O-rings (second seal members) 40b are installed respectively against the flanges 54. In this manner, by providing the pair of flanges 54 on both ends of the pipe 50, rigidity on the sides of both end portions of the pipe 50 can be increased, and therefore the durability of the pipe 50 can be enhanced.

Further, columnar shaped positioning pins (positioning means) 56, which project from the pipe 50, are disposed on the outer circumferential surface of the pipe 50. The positioning pins 56 are disposed in pairs, separated a predetermined distance along the axial directions (the directions of arrows A and B) of the pipe 50, as well as being disposed at symmetrical positions with respect to the center of the pipe 50. More specifically, the positioning pins 56 are disposed at four locations on the outer circumferential surface of the pipe 50.

The electrodes 52a, 52b are equipped with leads 58 that are connected to later-described substrates 62a, 62b. One of the electrodes 52a, 52b and the other of the electrodes 52a, 52b are disposed in symmetrical positions about the center of the pipe 50. More specifically, the electrodes 52a, 52b are disposed along a line in a direction transverse with respect to the axial direction of the pipe 50. Further, the electrodes 52a, 52b are formed with arcuate shapes in cross section, corresponding to the outer circumferential cross sectional shape of the pipe 50.

In addition, the electrodes 52a, 52b are bonded and fixed to the outer circumferential surface of the pipe 50, for example, by means of an electrically conductive adhesive. In this manner, by bonding the electrodes 52a, 52b to the pipe 50 through an electrically conductive adhesive, generation of stray capacitance between the electrodes 52a, 52b and the outer circumferential surface of the pipe 50 is suppressed suitably, and a favorable signal output can be obtained.

Further, the pipe unit 14 includes a pair of foam sheets 60a, 60b covering the electrodes 52a, 52b, a pair of substrate holders (holders) 64a, 64b, which are disposed on the outer sides of the foam sheets 60a, 60b and retain substrates 62a, 62b therein, and shield covers 66a, 66b disposed on the outer sides of the substrate holders 64a, 64b covering the substrates 62a, 62b. More specifically, the electrodes 52a, 52b, the foam sheets 60a, 60b, the substrate holders 64a, 64b and the shield covers 66a, 66b are each provided respectively in pairs, disposed respectively along a straight line symmetrically about the center of the pipe 50.

The foam sheets 60a, 60b are formed with substantially the same cross sectional arcuate shape as the electrodes 52a, 52b and are disposed so as to cover the entirety of the electrodes. As a result, turning up and peeling of the electrodes 52a, 52b that are bonded to the pipe 50 can suitably be prevented.

The substrate holders 64a, 64b include main body portions 68 formed, for example, from a resin material and having cross sectional arcuate shapes corresponding to the outer circumferential surface of the pipe 50, substrate retaining portions 70 formed on an upper part of the main body portion 68 and which are capable of retaining the substrates 62a, 62b therein, a pair of flanges 72 which project outwardly in the axial direction of the substrate holders 64a, 64b from both ends of the substrate retaining portions 70, and U-shaped hook members (engaging members) 74 that project outwardly from ends of the main body portion 68. In addition, the substrate holders 64a, 64b are installed so as to cover the outer circumferential sides of the foam sheets 60a, 60b through the main body portions 68, with the plate-shaped substrates 62a, 62b being mounted in the substrate retaining portions 70. The substrates 62a, 62b and leads 58 of the electrodes 52a, 52b are connected together electrically.

Further, latching grooves 76 in which the leads 58 of the electrodes 52a, 52b are latched and retained are provided in the substrate retaining portions 70, for thereby fixing the leads 58. Accordingly, when the leads 58 of the electrodes 52a, 52b are connected to the substrates 62a, 62b, the leads 58 are prevented from coming into contact with the shield covers 66a, 66b.

Furthermore, when the substrate holders 64a, 64b are installed on the pipe 50, the pair of hook members 74 engage respectively with respect to the pair of positioning pins 56, which are disposed on the outer circumferential surface of the pipe 50. Owing thereto, displacement of the substrate holders 64a, 64b in axial and rotational directions with respect to the pipe 50 is regulated, and the substrate holders 64a, 64b assume a properly positioned state on the pipe 50. As a result, the relative positional relationship between the substrate holders 64a, 64b in which the substrates 62a, 62b are mounted and the electrodes 52a, 52b does not change, so that normally, the substrates 62a, 62b and the substrate holders 64a, 64b are properly positioned in a state of being arranged on the outer circumferential sides of the electrodes 52a, 52b.

The shield covers 66a, 66b are formed, for example, from a metal material, and are fixed together with the substrates 62a, 62b onto the substrate holders 64a, 64b by bolts 78. Extraction holes 80 that face the substrates 62a, 62b accommodated therein are provided on upper surfaces of the shield covers 66a, 66b, whereby signal outputs from the substrates 62a, 62b can be taken out to the exterior through the extraction holes 80.

On the other hand, on the pipe unit 14, a pair of shield plates 82a, 82b are mounted from directions (i.e., the directions of arrows D1 and D2 in FIG. 7) perpendicular to the pair of electrodes 52a, 52b. The shield plates 82a, 82b are connected respectively by bolts 84 with respect to the pair of substrate holders 64a, 64b, which are disposed on the outer circumferential side of the electrodes 52a, 52b.

In greater detail, one of the shield plates 82a is affixed by bolts 84 to the substrate retaining portion 70 of one of the substrate holders 64a as well as to the substrate retaining portion 70 of the other of the substrate holders 64b. Similarly, the other of the shield plates 82b is affixed by bolts 84 to the substrate retaining portion 70 of one of the substrate holders 64a as well as to the substrate retaining portion 70 of the other of the substrate holders 64b.

In accordance therewith, the two shield plates 82a and 82b are affixed in positions sandwiching the pipe 50 therebetween, whereas the substrate holders 64a, 64b are fixed respectively in vertical directions (the directions of arrows C1 and C2) on the pipe 50 through the pair of shield plates 82a, 82b (see FIG. 6).

More specifically, concerning the electrodes 52a, 52b mounted on the pipe 50, the vertical (upper and lower) directions thereof (in the directions of arrows C1 and C2) are covered by the pair of shield covers 66a, 66b, whereas the horizontal (lateral) directions thereof (in the directions of arrows D1 and D2), which are transverse to the vertical directions (the directions of arrows C1 and C2), are covered by the pair of shield plates 82a, 82b. In general, it has been common to affix a shielding structure formed by such shield members by tape or the like, in a condition in which the pipe 50 is sandwiched between the shield members. However, as described above, by arranging the pairs of shield covers 66a, 66b and shield plates 82a, 82b so as to cover the pipe 50, and tightly fastening them mutually together by bolts 84, the shielding structure made up from the shield covers 66a, 66b and the shield plates 82a, 82b is highly stable, and further, a thorough and reliable electrical shield can be provided thereby as well.

The solenoid unit 18 includes a pair of yokes 86a, 86b formed substantially with U-shapes in cross section, disposed centrally about the pipe 50 constituting the pipe unit 14 in transverse directions (the directions of arrows D1, D2) to the pair of electrodes 52a, 52b, a pair of bobbins 88a, 88b fixed respectively to the yokes 86a, 86b, a pair of excitation plates 92a, 92b affixed through iron cores 90a, 90b in central portions of the bobbins 88a, 88b, and coils 94a, 94b, which are wound around the bobbins 88a, 88b.

The coils 94a, 94b, the yokes 86a, 86b, the bobbins 88a, 88b and the excitation plates 92a, 92b are disposed along a straight line at symmetrical positions sandwiching the pipe 50 therebetween. The yokes 86a, 86b, the iron cores 90a, 90b and the excitation plates 92a, 92b are formed from a highly conductive electromagnetic soft iron material, for example.

Each of the yokes 86a, 86b is formed, for example, by press molding a plate made from a metal material, and includes a planar surface portion 96, a pair of transverse walls 98 that extend perpendicularly toward sides of the substrate holders 64a, 64b (in the directions of arrows D1 and D2) from upper and lower end portions of the planar surface portion 96, and a pair of bent portions (barrier walls) 100 provided at both ends of the planar surface portion 96 and which are bent at right angles with respect thereto.

Specifically, the pair of transverse walls 98 are mutually disposed substantially in parallel with each other, and similarly, and the pair of bent portions 100 are also mutually disposed substantially in parallel with each other. In addition, the transverse walls 98 and the bent portions 100 extend perpendicularly in the same direction with respect to the planar surface portions 96. More specifically, when the yokes 86a, 86b are installed onto the pipe unit 14, the transverse walls 98 and the bent portions 100 constituting the yokes 86a, 86b are arranged so as to project toward the side of the pipe 50, and are disposed so as to cover each of the coils 94a, 94b respectively. The bent portions 100 are capable of preventing leakage of magnetic flux from the coils 94a, 94b.

Further, first guide members (attachment sections) 102, which project along the axial direction of the yokes 86a, 86b and project slightly with respect to upper surfaces of the transverse walls 98, are provided on ends of the transverse walls 98, whereas second guide members (attachment sections) 104 formed with roughly the same shape as the first guide members 102 are provided on the other ends thereof. The second guide members 104 project in the axial direction of the yokes 86a, 86b and are formed in the same plane as the transverse walls 98. That is, only the first guide members 102 are formed so as to project from the upper surface of the transverse walls 98.

The bobbins 88a, 88b around which the coils 94a, 94b are wound are affixed through bolts 106 in centers of the planar surface portions 96 on each of the yokes 86a, 86b. Furthermore, iron cores 90a, 90b, to which the excitation plates 92a, 92b have been caulked (crimped) beforehand, are inserted through central portions of the bobbins 88a, 88b and affixed thereto by the bolts 106.

In addition, the transverse walls 98 of the yokes 86a, 86b, which are assembled together in this manner from the bobbins 88a, 88b, the excitation plates 92a, 92b, etc., are arranged alongside the pipe 50, such that the first and second guide members 102, 104 are disposed on upper sides of the flanges 72 of the substrate holders 64a, 64b, and are affixed to attachment flanges 112 of the body 12 by bolts 110 via bushings 108.

At this time, the first guide members 102 of one of the yokes 86a are stacked together with the second guide members 104 of the other of the yokes 86b, the yokes 86a, 86b being arranged in confronting relation sandwiching the pipe 50 therebetween, and thereafter are arranged to abut against upper surfaces of the substrate holders 64a, 64b. Similarly, the second guide members 104 of one of the yokes 86a are stacked together with the first guide members 102 of the other of the yokes 86b, and thereafter are arranged to abut against upper surfaces of the substrate holders 64a, 64b.

More specifically, because the first guide members 102 and the second guide members 104 are disposed in a mutually shifted relation in the height directions (the directions of arrows C1, C2), when the two yokes 86a, 86b are arranged in confronting relation about the pipe 50, they are suitably overlapped and can be fastened together with the flanges 72 by the bolts 110.

Moreover, in this case, because the substrate holders 64a, 64b are formed from a resin material, the first yoke 86a and the second yoke 86b do not become electrically connected and are fastened in an electrically insulated state.

Further, the yokes 86a, 86b that make up the solenoid unit 18 are formed in the same shape and arranged in a confronting relation about the pipe 50 that makes up the pipe unit 14. In greater detail, the pair of yokes 86a, 86b are constructed so as to be capable of attachment in any condition rotated 180° along the outer circumferential surface of the pipe 50. In this manner, by providing the yokes 86a, 86b in a symmetrical state, since a uniform magnetic field can be generated inside the pipe 50 and components can be used in common, the costs required for a mold or the like can be reduced.

In addition, an excitation detection substrate 114 is disposed facing the third opening 32 of the body 12. Current is supplied to the coils 94a, 94b in accordance with a current control from the excitation detection substrate 114.

Figure 2:
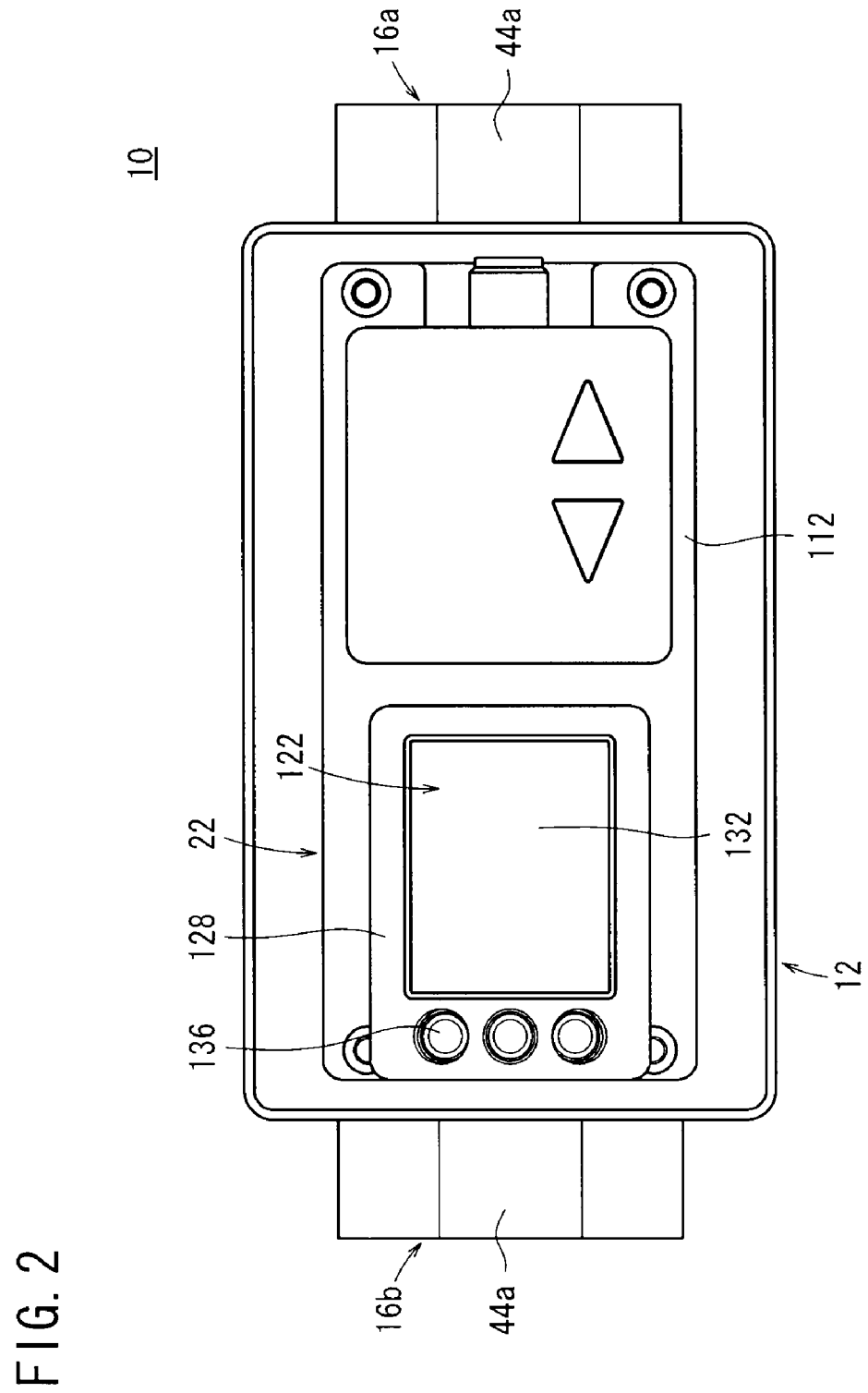
FIG. 2 is a plan view of the electromagnetic flowmeter shown in FIG. 1.

As shown in FIGS. 1, 2 and 4, the display unit 22 is disposed facing the third opening 32 of the body 12 and is installed in the body 12 through a front cover 116 formed in a plate-like shape. On the front cover 116, a moisture-preventive seal 118 is disposed via a groove on an abutting surface of the body 12. By abutment of the moisture-preventive seal 118 against the upper surface of the body 12, invasion of moisture from the exterior into the interior of the display unit 22 is prevented.

On one end side (in the direction of the arrow A) of the front cover 116, a connector 120 is disposed for enabling connection of a signal cable (not shown) thereto. By connecting the signal cable to the connector 120, a detection result detected by the electromagnetic flowmeter 10 can be output externally as a detection signal.

Further, on another side (in the direction of the arrow B) of the front cover 116, a display section 122 is disposed in a rotatable manner. The display section 122 comprises a base 126, which is retained rotatably on the front cover 116 through a rotation shaft 124, a box-shaped casing 128 installed on an upper part of the base 126, a display 130 accommodated inside the casing 128, a transparent and translucent plate 132 disposed facing the display 130, a control substrate 134 for carrying out control of the display 130 and other associated components, and buttons 136 through which operations can be performed to effect display switching of the display section 122.

The translucent plate 132, for example, is formed from a resin material having a light transmissive property and is insert-molded into a hole that opens upwardly, so that the translucent plate 132 is installed in the casing 128 while being exposed to the exterior. Consequently, the display section 122 accommodated inside the casing 128 can be seen and perceived visually through the translucent plate 132.

The electromagnetic flowmeter 10 according to the embodiment of the invention is basically constructed as described above. Next, a method for assembling the electromagnetic flowmeter 10 shall be explained.

Figure 3:
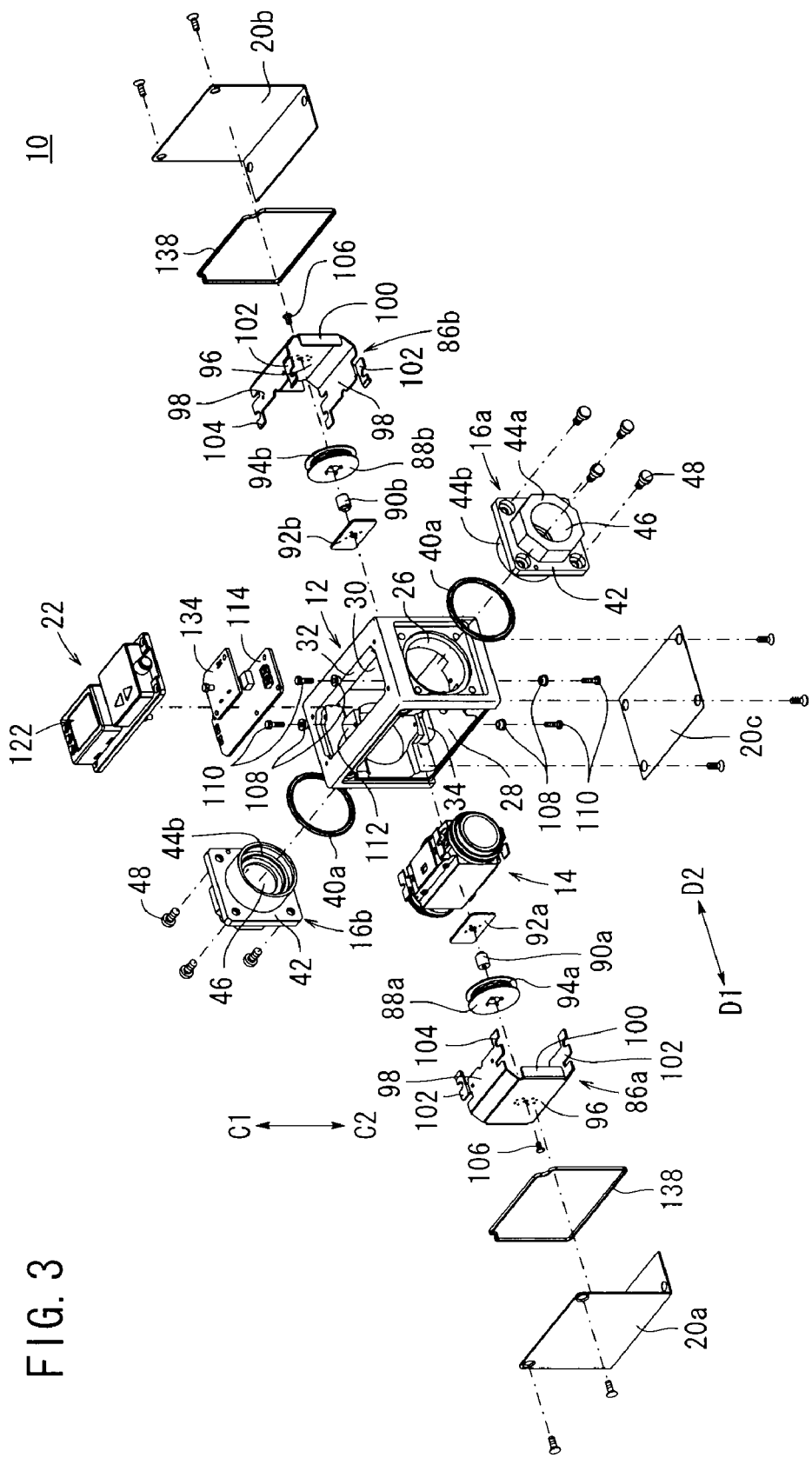
FIG. 3 is an exploded perspective view of the electromagnetic flowmeter of FIG. 1.
Figure 8:
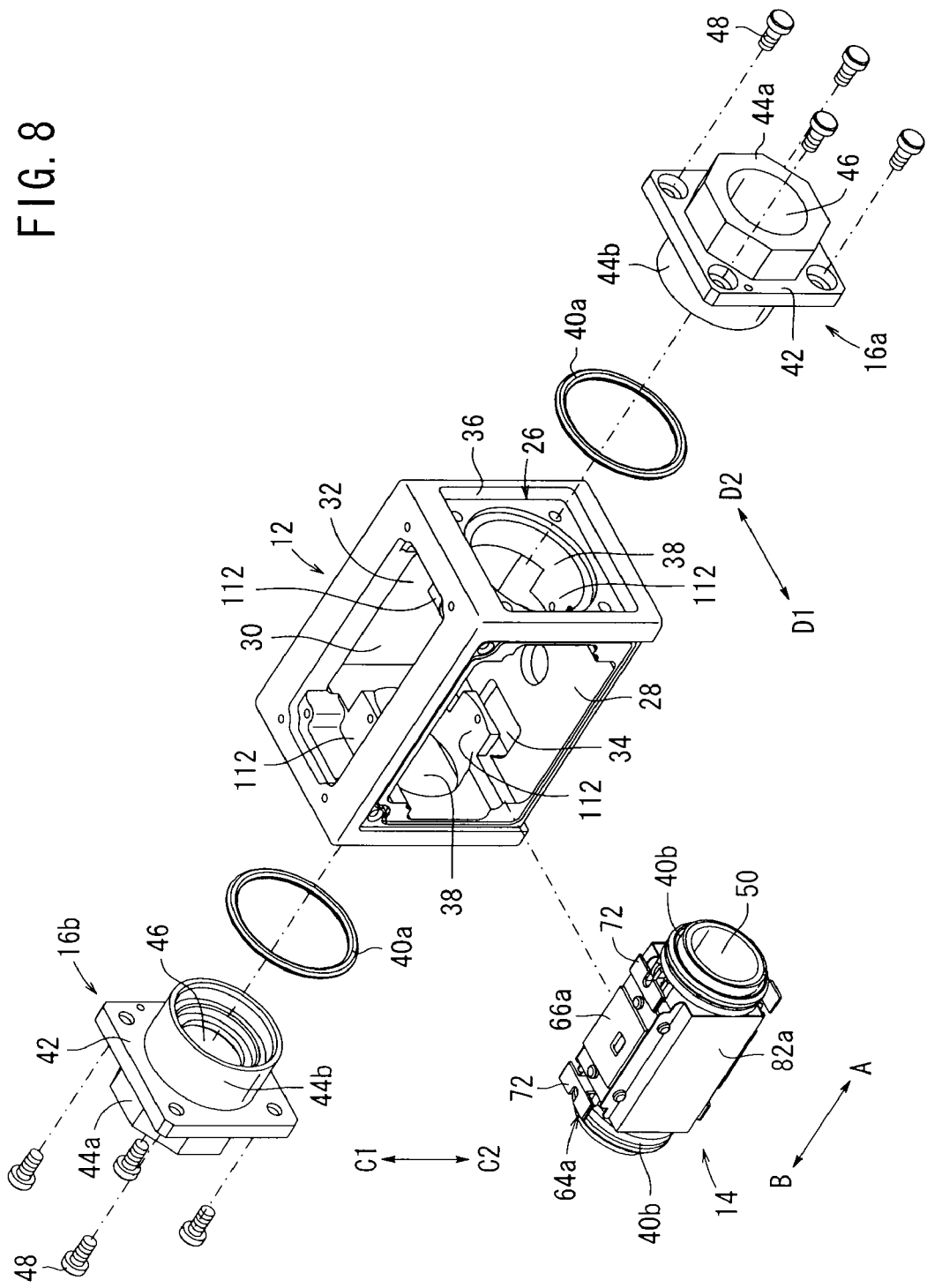
FIG. 8 is an exploded perspective view showing a condition in which the pipe unit, o-rings, and fittings shown in FIG. 7 are removed from a body.

Initially, with reference to FIGS. 3, 7 and 8, an explanation shall be made briefly concerning assembly of the pipe unit 14.

First, when the pipe unit 14 is assembled, as shown in FIG. 7, after the o-rings 40b have been installed onto both ends of the pipe 50 through the flanges 54, the pair of electrodes 52a, 52b is bonded to the outer circumferential surface of the pipe 50, and the foam sheets 60a, 60b are mounted respectively on the outer peripheral surfaces of each of the electrodes 52a, 52b. In addition, the main body portions 68 of the substrate holders 64a, 64b having the substrates 62a, 62b mounted therein are installed so as to cover the foam sheets 60a, 60b. Then, the shield covers 66a, 66b are installed and fastened by bolts 78, while covering the substrates 62a, 62b and the substrate retaining portions 70.

On the other hand, the pair of shield plates 82a, 82b are mounted with respect to the pipe 50 from directions (the directions of arrows D1, D2) perpendicular to the substrate holders 64a, 64b, and the shield plates 82a, 82b are affixed by bolts 84 with respect to upper and lower portions of each of the substrate holders 64a, 64b. Consequently, as shown in FIGS. 4 to 6, the pipe unit 14 is constructed such that the electrodes 52a, 52b, the substrates 62a, 62b, and the shield covers 66a, 66b are disposed in vertical directions (the directions of arrows C1, C2), whereas the shield plates 82a, 82b are installed in a lateral (sideways) direction of the pipe 50, perpendicularly to the substrates 62a, 62b.

When the pipe unit 14, which has been assembled in the foregoing manner, is assembled into the body 12, first, the pipe unit 14 is inserted into the space 24 from the first opening 28, which opens on a side surface of the body 12. In this case, both ends of the pipe unit 14 are inserted substantially in parallel with the body 12, while facing toward the installation holes 26 of the body 12, respectively.

Additionally, after the o-rings 40a have been mounted respectively into the pair of installation holes 26, the fittings 16a, 16b are mounted and fixed by attachment bolts 48 in both ends of the body 12, such that the tubular portions 44b are inserted into the fitting holes 38 of the installation holes 26. As a result, the tubular portions 44b of the fittings 16a, 16b are installed respectively so as to cover both ends of the pipe unit 14, and the o-rings 40b, which are mounted on the pipe 50, abut against inner circumferential surfaces of the tubular portions 44b. Consequently, a fluid-tight condition is maintained by the o-rings 40b, while the through holes 46 of the fittings 16a, 16b and the interior of the pipe 50 are placed in a state of communication.

Further, at the same time, the flanges 72 of the substrate holders 64a, 64b that make up the pipe unit 14 are affixed by bolts 110 via the bushings 108 with respect to the attachment flanges 112 disposed on the side of the third opening 32 of the body 12. Consequently, the pipe unit 14 is firmly fastened through the fittings 16a, 16b, etc., while being accommodated inside the space 24 of the body 12.

Next, the pair of yokes 86a, 86b, on which the coils 94a, 94b, the bobbins 88a, 88b, the iron cores 90a, 90b and the excitation plates 92a, 92b have been installed, are mounted respectively onto both sides of the pipe unit 14, and thereafter, the first opening 28 and the second opening 30 of the body 12 are blocked respectively by the cover members 20a, 20b through respective annular sealing members 138. One of the yokes 86a is inserted from the first opening 28 of the body 12 into the interior thereof and is mounted onto the pipe unit 14, whereas the other yoke 86b is inserted into the interior from the second opening 30 of the body 12 and is mounted onto the pipe unit 14.

In this case, the yokes 86a, 86b are pressed onto sides of the pipe unit 14 from respective lateral (sideways) directions of the pipe unit 14, whereupon the first guide members 102 and the second guide members 104 thereof overlap with each other and are made to engage with the flanges 72 of the substrate holders 64a, 64b through the bolts 110 and the bushings 108. More specifically, the pair of yokes 86a, 86b need not be fixed with respect to the pipe unit 14 by bolts or the like, but rather, the yokes 86a, 86b can easily and reliably be fixed together while sandwiching the pipe unit 14 therebetween.

Lastly, after the excitation detection substrate 114 has been installed inside the body 12, the display unit 22 is installed and affixed by bolts covering the third opening 32, and the cover member 20c is installed to seal the bottom portion of the body 12.

In this manner, after the pipe unit 14, which is capable of measuring the flow rate of a subject fluid to be measured, has been affixed beforehand in the interior of the body 12, the solenoid unit 18, including the coils 94a, 94b that become excited when electrically energized, can be mounted onto the pipe unit 14 through the first and second openings 28, 30 of the body 12, and the display unit 22, which is capable of displaying a flow rate or the like of the fluid to be measured, can be easily and reliably installed on an upper portion of the body 12.

Owing thereto, the number of parts of the electromagnetic flowmeter 10 is not increased excessively, and ease of assembly of the electromagnetic flowmeter 10 is enhanced. Also, the apparatus overall can be made smaller in scale.

In the electromagnetic flowmeter 10 assembled in the foregoing manner, unillustrated pipes are connected to the pair of fittings 16a, 16b, and a measurement fluid (fluid) is supplied from a non-illustrated measurement fluid supply source to the pipes. In addition, the measurement fluid passes through one of the fittings 16a on an upstream side of the electromagnetic flowmeter 10, flows into the interior of the pipe 50 that constitutes the pipe unit 14, and is directed out of the electromagnetic flowmeter 10 through the other fitting 16b, which is disposed on the downstream side.

Further, by supply of electrical energy thereto, the coils 94a, 94b constituting the solenoid unit 18 are excited, whereupon a magnetic field is generated, which is oriented perpendicularly (in the directions of arrows D1, D2) to the pipe 50, on which the coils 94a, 94b are arranged in a confronting relation. An electromotive force is detected by the two electrodes 52a, 52b, which are arranged perpendicularly to the magnetic field (in the directions of arrows C1, C2), and the flow rate of the measurement fluid is calculated from the electromotive force, which is output to the controller. Consequently, the flow rate of the measurement fluid that flows through the inside of the electromagnetic flowmeter 10 is detected and displayed on the display section 122 of the display unit 22. At this time, because the display section 122 is disposed rotatably with respect to the body 12, it can be easily rotated and oriented in a position that facilitates viewing by an operator, so that the displayed content can easily be confirmed.

More specifically, depending on the installed orientation of the electromagnetic flowmeter 10, it is conceivable that viewing of the display section 122 may become problematic. However, in this case as well, the display section 122 can be rotated in a desired direction irrespective of the installation orientation, thus enabling the flow rate to be easily viewed and confirmed.

The electromagnetic flowmeter according to the present invention is not limited to the above-described embodiment. It is a matter of course that various other structures or modifications thereto could be adopted, without deviating from the essence and gist of the present invention as set forth in the appended claims.

What is claimed is:

1. An electromagnetic flowmeter comprising:
   a body;
   a measurement tube accommodated in the interior of the body and having a flow passage through which a fluid to be measured flows;
   a pair of electrodes disposed opposing each other on an outer circumferential side of the measurement tube and configured to detect an electromotive force generated by a flow of the fluid to be measured; and
   a solenoid unit disposed transversely to the electrodes on the outer circumferential side of the measurement tube, and having coils, which are each wound around a core and are excited by supplying electricity thereto and which generate a magnetic field inside the measurement tube, wherein the solenoid unit comprises a pair of yokes configured to retain the coils and the cores, the yokes being arranged opposing each other and sandwiching the measurement tube therebetween,
   wherein the measurement tube is disposed detachably with respect to the body, and
   the yokes each include a planar surface portion having four sides, and each of the four sides has a bent portion protruding therefrom which is centered about a respective one of the coils toward a side of the measurement tube, wherein at least two of the four sides are bent perpendicular to the planar surface portion to thereby provide barrier walls configured to prevent leakage of magnetic flux from the coils.

2. The electromagnetic flowmeter according to claim 1, wherein the measurement tube is affixed to the body via fittings installed onto end portions of the body, through which the fluid to be measured is introduced and led out.

3. The electromagnetic flowmeter according to claim 2, further comprising:
   an opening on a side surface of the body configured to enable the measurement tube to be inserted from the exterior of the body into the interior of the body.

4. The electromagnetic flowmeter according to claim 2, wherein first seal members configured to prevent ingress of moisture from the exterior into the interior of the body are disposed between the body and the fittings, and second seal members, which are configured to maintain the fluid to be measured in a hermetic condition, are disposed between the fittings and the measurement tube.

5. The electromagnetic flowmeter according to claim 1, wherein the yokes are affixed to the body through holders made from a resin material.

6. The electromagnetic flowmeter according to claim 5, wherein the yokes include attachment sections which are configured to engage with the holders, the attachment sections being engaged with respect to the holders, which are mounted on the measurement tube, by insertion of the attachment sections therein.

7. The electromagnetic flowmeter according to claim 1, wherein the electrodes are adhered to and fixed with respect to the measurement tube by an electrically conductive adhesive.

8. The electromagnetic flowmeter according to claim 1, wherein the measurement tube comprises a pair of flanges on both ends thereof.

9. The electromagnetic flowmeter according to claim 1, further comprising:
   a pipe unit including the electrodes mounted on the measurement tube and which is disposed detachably with respect to the body.

* * * * *

UNITED STATES PATENT AND TRADEMARK OFFICE
CERTIFICATE OF CORRECTION

| | |
|---|---|
| PATENT NO. | : 8,127,622 B2 |
| APPLICATION NO. | : 12/409145 |
| DATED | : March 6, 2012 |
| INVENTOR(S) | : Hiroshi Kawakami et al. |

It is certified that error appears in the above-identified patent and that said Letters Patent is hereby corrected as shown below:

On the title page, Item (54), and column 1, the title is incorrect. Item (54) and column 1, should read:

-- ELECTROMAGNETIC FLOWMETER HAVING A DETACHABLE MEASURING TUBE FROM THE BODY --

Signed and Sealed this
Fifteenth Day of May, 2012

David J. Kappos
*Director of the United States Patent and Trademark Office*